(12) United States Patent
Tian et al.

(10) Patent No.: US 12,153,891 B2
(45) Date of Patent: Nov. 26, 2024

(54) CLASSIFICATION OF USER SENTIMENT BASED ON MACHINE LEARNING

(71) Applicant: Home Depot Product Authority, LLC, Atlanta, GA (US)

(72) Inventors: Haozheng Tian, Atlanta, GA (US); James Morgan White, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 141 days.

(21) Appl. No.: 17/417,685

(22) PCT Filed: Jun. 21, 2021

(86) PCT No.: PCT/US2021/038277
§ 371 (c)(1),
(2) Date: Jun. 23, 2021

(87) PCT Pub. No.: WO2021/258058
PCT Pub. Date: Dec. 23, 2021

(65) Prior Publication Data
US 2023/0196023 A1  Jun. 22, 2023

Related U.S. Application Data

(60) Provisional application No. 63/040,955, filed on Jun. 18, 2020.

(51) Int. Cl.
*G06F 40/30* (2020.01)
*G06F 40/247* (2020.01)
*G06V 30/19* (2022.01)

(52) U.S. Cl.
CPC ............ *G06F 40/30* (2020.01); *G06F 40/247* (2020.01); *G06V 30/19093* (2022.01); *G06V 30/19107* (2022.01)

(58) Field of Classification Search
USPC .................................................. 704/9, 1–504
See application file for complete search history.

(56) References Cited

U.S. PATENT DOCUMENTS 9,672,497 B1 * 6/2017 Lewis .................... G06F 40/284
10,157,347 B1 * 12/2018 Kasturi ............... G06F 16/3326
(Continued)

FOREIGN PATENT DOCUMENTS

CA        3179975 A1 * 12/2021 ........... G06F 40/247
WO    WO-2014183089 A1 * 11/2014 ........ G06F 17/30011
(Continued)

OTHER PUBLICATIONS

ISA/US, Int'l Search Report and Written Opinion issued in PCT/US2021/038277, dated Sep. 22, 2021, 7 pgs.
(Continued)

*Primary Examiner* — Marcus T Riley
(74) *Attorney, Agent, or Firm* — Greenberg Traurig, LLP (57) ABSTRACT

A system and method for machine learning classification of user sentiment is disclosed. The method includes storing including a plurality of category information. The plurality of category information includes a set of domain-specific category information. The method further includes extracting a plurality of aspects from textual data. The method further includes generating a sentiment by a machine learning model. The method further includes receiving the plurality of aspects and the set of domain-specific category information. The method further includes generating a sentiment based on the plurality of aspects and the set of domain-specific category information.

13 Claims, 9 Drawing Sheets

(56) References Cited

U.S. PATENT DOCUMENTS

| | | | |
|---|---|---|---|
| 11,205,103 B2* | 12/2021 | Zhang | G06V 10/774 |
| 11,561,987 B1* | 1/2023 | Sager | G06F 16/906 |
| 11,574,004 B2* | 2/2023 | Wolkowicz | G06F 18/2135 |
| 11,675,977 B2* | 6/2023 | Munro | G06F 40/284 704/9 |
| 11,892,901 B2* | 2/2024 | Skiff | G06F 16/248 |
| 2011/0099133 A1* | 4/2011 | Chang | G06F 16/353 706/12 |
| 2011/0252036 A1 | 10/2011 | Neylon et al. | |
| 2012/0041937 A1 | 2/2012 | Dhillon et al. | |
| 2016/0171369 A1 | 6/2016 | Majumdar | |
| 2018/0165554 A1* | 6/2018 | Zhang | G06N 3/045 |
| 2019/0286898 A1* | 9/2019 | Powell | G06F 16/22 |
| 2022/0114405 A1* | 4/2022 | Zhang | G06N 3/045 |
| 2023/0196023 A1* | 6/2023 | Tian | G06V 30/19107 704/9 |

FOREIGN PATENT DOCUMENTS

| | | | | |
|---|---|---|---|---|
| WO | WO-2014183089 A9 * | 1/2015 | | G06F 17/30011 |
| WO | WO-2021258058 A1 * | 12/2021 | | G06F 40/247 |

OTHER PUBLICATIONS

Jabreel et al., "Introducing Sentiment Analysis of Textual Reviews in a Multi-Criteria Decision Aid System", Appl. Sci. 2021, 11(1), 216, Retrieved on Aug. 18, 2021. Retrieved from <URL: https://www.mdpi.com/2076-3417/11/1/216#cite> entire document.

Khairnar et al., "Machine Learning Algorithms for Opinion Mining and Sentiment Classification", International Journal of Scientific and Research Publications, vol. 3, Issue 6, Jun. 2013. Retrieved on Aug. 18, 2021. Retrieved from <URL: http//citeseerx.ist.psu.edu/viewdoc/download?doi=10.1.1.416.6042&rep=1&type=pdf#page=274> pp. 724-729.

Zhang "Context-Preserving Visual Analytics of Multi-Scale Spatial Aggregation", Purdue University. ProQuest Dissertations Publishing, 2018. Retrieved on Aug. 18, 2021. Retrieved from <URL: https://www.proquest.com/docview/2054014256?pq-origsite=gscholar&fromopenview=true> entire document.

Ayoub Bagheri, Mohamad Saraee, and Franciska de Jong. 2013. An unsupervised aspect detection model for sentiment analysis of reviews. In International conference on application of natural language to information systems. Springer, 140-151.

Peiman Barnaghi, Georgios Kontonatsios, Nik Bessis, and Yannis Korkontzelos. 2019. Aspect Extraction from Reviews Using Convolutional Neural Networks and Embeddings. In International Conference on Applications of Natural Language to Information Systems. Springer, 409-415.

Vishal Bhatnagar, Mahima Goyal, and Md Anayat Hussain. 2016. A Proposed framework for improved identification of implicit aspects in tourism domain using supervised learning technique. In Proceedings of the International Conference on Advances in Information Communication Technology & Computing, 1-4.

Daniel Cer, Yinfel Yang, Sheng-yi Kong, Nan Hua, Nicole Limtiaco, Rhomni St John, Noah Constant, Mario Guajardo-Cespedes, Steve Yuan, Chris Tar, et al. 2018. Universal sentence encoder. arXiv preprint arXiv:1803.11175 (2018), 7 pgs.

Tao Chen, Ruifeng Xu, Yulan He, and Xuan Wang. 2017. Improving sentiment analysis via sentence type classification using BILSTM-CRF and CNN. Expert Systems with Applications 72 (2017), 221-230.

Yejin Choi and Claire Cardie. 2010. Hierarchical sequential learning for extracting opinions and their attributes. In Proceedings of the ACL 2010 conference short papers. Association for Computational Linguistics, 269-274.

Ivan Cruz, Alexander Gelbukh, and Grigori Sidorov. 2014. Implicit Aspect Indicator Extraction for Aspect based Opinion Mining. Int. J. Comput. Linguistics Appl. 5 (2014), 135-152.

Jacob Devlin, Ming-Wei Chang, Kenton Lee, and Kristina Toutanova. 2018. Bert: Pre-training of deep bidirectional transformers for language understanding. arXiv preprint arXiv:1810.04805 (2018).

Mng Ding, Jianfei Yu, and Jing Jiang. 2017. Recurrent neural networks with auxiliary labels for cross-domain opinion target extraction. In Thirty-First AAAI Conference on Artificial Intelligence.

Christiane Fellbaum. 1998. A semantic network of English verbs. WordNet: An electronic lexical database 3 (1998), 153-178.

Sheng Huang, Xinlan Liu, Xueping Peng, and Zhendong Niu. 2012. Fine-grained product features extraction and categorization in reviews opinion mining. In 2012 IEEE 12th International Conference on Data Mining Workshops. IEEE, 680-686.

Saratchandra Indrakanti and Gyanit Singh. 2018. A Framework to Discover Significant Product Aspects from e-Commerce Product Reviews. In eCOM@SIGIR.

Peng Jiang, Chunxia Zhang, Hongping Fu, Zhendong Niu, and Qing Yang. 2010. An approach based on tree kernels for opinion mining of online product reviews. In 2010 IEEE International Conference on Data Mining. IEEE, 256-265.

Wei Jiang, Hao Pan, and Qing Ye. 2014. An improved association rule mining approach to identification of implicit product aspects. The Open Cybernetics & Systemics Journal 8, 1 (2014).

Wei Jin, Hung Hay Ho, and Rohini K Srihari. 2009. A novel lexicalized HMMbased learning framework for web opinion mining. In Proceedings of the 26th annual international conference on machine learning, vol. 10. Citeseer. conference on artificial intelligence.

Wel Jin, Hung Hay Ho, and Rohini K Srihari. 2009. OpinionMiner: a novel machine learning system for web opinion mining and extraction. In Proceedings of the 15th ACM SIGKDD international conference on Knowledge discovery and data mining. 1195-1204.

T Karthikeyan and N Ravikumar. 2014. A survey on association rule mining. International Journal of Advanced Research in Computer and Communication Engineering 3, 1 (2014), 2278-1021.

Fangtao Li, Chao Han, Minlie Huang, Xiaoyan Zhu, Ying-Ju Xia, Shu Zhang, and Hao Yu. 2010. Structure-aware review mining and summarization. In Proceedings of the 23rd international conference on computational linguistics. Association for Computational Linguistics, 653-661.

Shoushan Li, Rongyang Wang, and Guodong Zhou. 2012. Opinion target extraction using a shallow semantic parsing framework. In Twenty-sixth AAAI conference on artificial intelligence.

Yan Li, Zhen Qin, Weiran Xu, and Jun Guo. 2015. A holistic model of mining product aspects and associated sentiments from online reviews. Multimedia Tools and Applications 74, 23 (2015), 10177-10194.

Kang Liu, Liheng Xu, and Jun Zhao. 2012. Opinion target extraction using word-based translation model. In Proceedings of the 2012 joint conference on empirical methods in natural language processing and computational natural language learning. Association for Computational Linguistics, 1346-1356.

Kang Liu, Liheng Xu, and Jun Zhao. 2014. Co-extracting opinion targets and opinion words from online reviews based on the word alignment model. IEEE Transactions on knowledge and data engineering 27, 3 (2014), 636-650.

Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019. Roberta: A robustly optimized bert pretraining approach. arXiv preprint arXiv:1907.11692 (2019).

Tomas Mikolov, Ilya Sutskever, Kai Chen, Greg S Corrado, and Jeff Dean. 2013. Distributed representations of words and phrases and their compositionality. In Advances in neural information processing systems. 3111-3119.

Arjun Mukherjee and Bing Liu. 2012. Aspect extraction through semi-supervised modeling. In Proceedings of the 50th annual meeting of the association for computational linguistics: Long papers-vol. 1. Association for Computational Linguistics, 339-348.

Huy Nguyen and Minh-Le Nguyen. 2017. A deep neural architecture for sentencelevel sentiment classification in twitter social networking. In International Conference of the Pacific Association for Computational Linguistics. Springer, 15-27.

(56) References Cited

OTHER PUBLICATIONS

Songwen Pei, Lulu Wang, Tianma Shen, and Zhong Ning. 2019. DA-BERT: Enhancing Part-of-Speech Tagging of Aspect Sentiment Analysis Using BERT. In International Symposium on Advanced Parallel Processing Technologies. Springer, 86-95.

Matthew E Peters, Mark Neumann, Mohit Iyyer, Matt Gardner, Christopher Clark, Kenton Lee, and Luke Zettlemoyer. 2018. Deep contextualized word representations. arXiv preprint arXiv:1802.05365 (2018).

Soujanya Poria, Erik Cambria, and Alexander Gelbukh. 2016. Aspect extraction for opinion mining with a deep convolutional neural network. Knowledge-Based Systems 108 (2016), 42-49.

Soujanya Poria, Erik Cambria, Lun-Wei Ku, Chen Gui, and Alexander Gelbukh. 2014. A rule-based approach to aspect extraction from product reviews. In Proceedings of the second workshop on natural language processing for social media (SocialNLP). 28-37.

Guang Qiu, Bing Liu, Jlajun Bu, and Chun Chen. 2011. Opinion word expansion and target extraction through double propagation. Computational linguistics 37, 1 (2011), 9-27.

Changqin Quan and Fuji Ren. 2014. Unsupervised product feature extraction for feature-oriented opinion determination. Information Sciences 272 (2014), 16-28.

Santosh Raju, Prasad Pingali, and Vasudeva Varma. 2009. An unsupervised approach to product attribute extraction. In European Conference on Information Retrieval. Springer, 796-800.

Toqir A Rana and Yu-N Cheah. 2016. Aspect extraction in sentiment analysis: comparative analysis and survey. Artificial Intelligence Review 46, 4 (2016), 459-483.

Kim Schouten, Onne Van Der Weijde, Flavius Frasincar, and Rommert Dekker. 2017. Supervised and unsupervised aspect category detection for sentiment analysis with co-occurrence data. IEEE transactions on cybernetics 48, 4 (2017), 1263-1275.

Lei Shu, Hu Xu, and Bing Liu. 2017. Lifelong learning crf for supervised aspect extraction. arXiv preprint arXiv:1705.00251 (2017).

Qi Su, Xinying Xu, Honglei Guo, Zhill Guo, Xian Wu, Xiaoxun Zhang, Bin Swen, and Zhong Su. 2008. Hidden sentiment association in chinese web opinion mining. In Proceedings of the 17th international conference on World Wide Web. 959-968.

Chi Sun, Luyao Huang, and Xipeng Qiu. 2019. Utilizing bert for aspect-based sentiment analysis via constructing auxiliary sentence. arXiv preprint arXiv:1903.09588 (2019).

Trang Uyen Tran, Ha Thi-Thanh Hoang, and Hiep Xuan Huynh. 2020. Bidirectional Independently Long Short-Term Memory and Conditional Random Field Integrated Model for Aspect Extraction in Sentiment Analysis. In Frontiers in Intelligent Computing: Theory and Applications. Springer, 131-140.

Tao Wang, Yi Cai, Ho-fung Leung, Raymond YK Lau, Qing Li, and Huaqing Min. 2014. Product aspect extraction supervised with online domain knowledge. Knowledge-Based Systems 71 (2014), 86-100.

Wenya Wang, Sinno Jialin Pan, Daniel Dahlmeier, and Xiaokui Xiao. 2016. Recursive neural conditional random fields for aspect-based sentiment analysis. arXiv preprint arXiv:1603.06679 (2016).

Thomas Wolf, Lysandre Debut, Victor Sanh, Julien Chaumond, Clement Delangue, Anthony Moi, Pierric Cistac, Tim Rault, R'emi Louf, Morgan Funtowicz, and Jamie Brew. 2019. HuggingFace's Transformers: State-of-the-art Natural Language Processing. ArXiv abs/1910.03771 (2019).

Zhilin Yang, Zihang Dai, Yiming Yang, Jaime Carbonell, Russ R Salakhutdinov, and Quoc V Le. 2019. XInet: Generalized autoregressive pretraining for language understanding. In Advances in neural information processing systems. 5754-5764.

Muhamad Rizky Yanuar and Shun Shiramatsu. 2020. Aspect Extraction for Tourist Spot Review in Indonesian Language using BERT. In 2020 International Conference on Artificial Intelligence in Information and Communication (ICAIIC). IEEE, 298-302.

Zhongwu Zhai, Bing Liu, Hua Xu, and Peifa Jia. 2010. Grouping product features using semi-supervised learning with soft-constraints. In Proceedings of the 23rd international conference on computational linguistics. Association for Computational Linguistics, 1272-1280.

Yuebing Zhang, Zhifel Zhang, Duoqian Miao, and Jiaqi Wang. 2019. Three-way enhanced convolutional neural networks for sentence-level sentiment classification. Information Sciences 477 (2019), 55-64.

Jingbo Zhu, Huizhen Wang, Muhua Zhu, Benjamin K Tsou, and Matthew Ma. 2011. Aspect-based opinion polling from customer reviews. IEEE Transactions on affective computing 2, 1 (2011), 37-49.

\* cited by examiner

CLASSIFICATION OF USER SENTIMENT BASED ON MACHINE LEARNING

CROSS-REFERENCE TO RELATED APPLICATION

This application claims the benefit of priority to U.S. Provisional Application No. 63/040,955, filed Jun. 18, 2020, the entirety of which is hereby incorporated by reference.

TECHNICAL FIELD

This disclosure relates to improving classification of user sentiment using machine learning.

BACKGROUND

Customer reviews are becoming increasingly important to assist users of e-commerce platforms. Reviews from users may reflect aspects of a product or service that are deemed valuable by other users, which may not be mentioned or emphasized in product descriptions.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

The instant disclosure includes an end-to-end pipeline for product aspects detection from user reviews and sentiment analysis. Accumulating an abundant amount of customer reviews for products is an efficient approach to build user trust. However, at the same time, the enormous amount of reviews becomes an obstacle for a customer to fully grasp the consensus opinion on aspects that the customer truly cares about. Additionally, the vast diversity in vocabulary used in reviews introduces difficulty for quick and accurate comprehension. Aspect detection is described herein for both explicit and implicit aspects. Further, a gated-RoBERTa-based sentiment classifier for sentiment analysis is disclosed, which exhibits outstanding performances in a multi-domain corpus.

Customer reviews provide valuable product insights that can be utilized to enhance the accuracy and comprehensiveness of product information. Aspect extraction as disclosed herein may leverage NLP techniques to reinforce readability and interpretation of a large amount of information in favor of frictionless interaction between a user and a search interface. A framework to generate product insights (e.g., sentiment) based on customer reviews and present them based on a ranking of importance is thus disclosed. To fully exploit the capacity of reviews and the information contained in a number of reviews, a method to extract both explicit and implicit aspects is disclosed. Additionally, a universal sentence encoder (USE) is disclosed to incorporate with a hierarchical clustering to infer semantic relationships and guide aspect merging. Clustering of implicit and explicit aspects may be achieved by leveraging synonyms and antonyms of grouped implicit aspects, in some embodiments.

Figure 1:
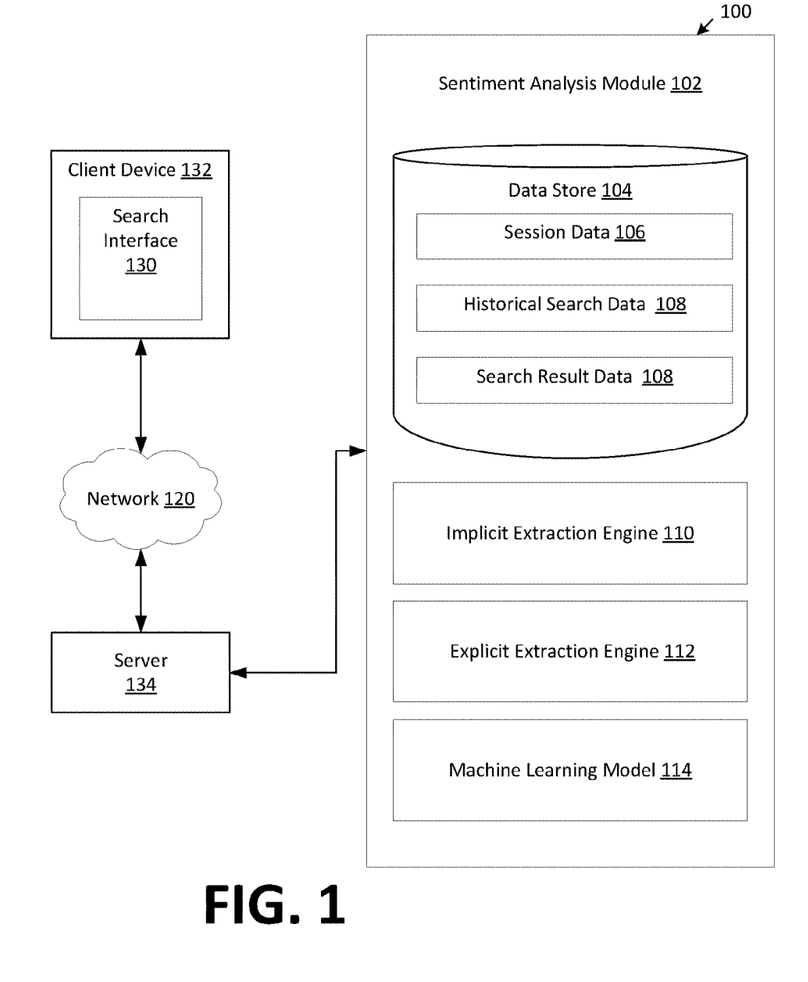
FIG. 1 is a block diagram illustrating an example of a system for implementing a semantic analysis model, according to certain aspects of the present disclosure.

Referring now to the drawings, wherein like numerals refer to the same or similar features in the various views, FIG. 1 is a block diagram illustrating an example of a system 100 for implementing a sentiment analysis model. The system 100 may include a sentiment analysis module 102, a network 120, a search interface 130 provided on a client device 132, and a server 134. The search interface 130 may be or may include, for example, search functionality included on a website, application, or other user interface. The server 134 may host the website, application, or other user interface. The server may further be in communication with the sentiment analysis module 102 to provide user input entered through the search interface 130 or elsewhere on an associated user interface to the sentiment analysis module 102, to receive user sentiment information determined by the sentiment analysis module 102, and to provide that sentiment information to users through the user interface. The sentiment analysis module 102 may receive textual data from the search interface 130 over network 120 via the server 134. The search interface 130 may receive inputs entered through the client device 132, such as provided by a user during an interaction with the search interface 130.

The sentiment analysis module 102 may include a data store 104, implicit extraction engine module 110, explicit extraction engine 112, and machine learning model 114. The sentiment analysis module 102 may receive textual data from search interface 130 via the server 134. The search interface 130 may receive inputs from a user of a client device 132 such as a search query, an electronic document, or the like that may include text or other semantic data. The network 120 may include known wireless and/or wired networks.

The implicit extraction engine 110 and explicit extraction engine 112 may be implemented as separate or combined software and hardware resources. The implicit extraction engine 110 may be generally configured to extract implicit aspects from textual data. In one example, the sentiment analysis module 102 may receive textual data from the search interface.

The implicit extraction engine 110 may process textual data, such as user reviews, to identify implicit aspects included in the textual data. An implicit aspect may generally be a part of speech such as a verb or adjective that may convey opinion information. The implicit extraction engine 110 may be able to extract a corresponding explicit aspect through semantic and logical analysis. An explicit aspect may be or may include an attribute or feature of a product, service, object, etc., and thus may generally be represented by nouns and certain verb phrases.

To illustrate an example of implicit extraction, in this example, the sentiment analysis module 102 receives the sentence "It is gorgeous and very easy to use!" The implicit extraction engine extracts the adjective "gorgeous" and determines, based on semantic and logical analysis, that the corresponding explicit aspect may be "design/style". The implicit extraction engine 110 may recognize implicit aspects of textual data by identifying adjectives that are not in a curated "stop list." The stop list may include adjectives that are rarely related to objects, or features of products. Some examples of adjectives on a stop list may include words such as "anxious," or "frustrated," or "forward," or "enough" or the like.

The explicit extraction engine 112 may be generally configured to extract explicit aspects from textual data, such as user reviews. In one example, the sentiment analysis module 102 may receive textual data from the search interface 130. The explicit extraction engine 112 may determine one or more explicit aspects of a product that specifically describe an attribute or feature of an object, a product, or a service from the textual data.

An example of an explicit aspect is an attribute or feature that occurs frequently within a corpus of textual data such as user reviews. As one of skill in the art may appreciate, explicit aspects may differ based on frequency of occurrence between categories of objects, products, or services. In one example, the textual data may be a customer review of a product. The explicit extraction engine 112 may differentiates frequent terms that may be related to the product (which terms may reflect user sentiment) from frequent terms that may not be related to the product.

The explicit extraction engine 112 may search the textual data and extract nouns and noun phrases. The explicit extraction engine 112 may also search the textual data and extract certain verb phrases where a potential explicit aspect word appears in a lemmatized or a slightly modified form such as in plural.

In one example, the sentiment analysis module receives textual data including the sentence "Works well, lots of space, loving the side by side design much more than my old French door." The sentiment analysis module 102, the machine learning model 114, or the explicit extraction engine 112 may previously define "space" as an attribute of a product classified as a refrigerator. The term "space" in conjunction with the modifier "lots of" may therefore be recognized as an explicit aspect of the refrigerator associates with the textual data.

The explicit extraction engine may extract explicit aspects by recognizing one or more noun chunks in a sentence. The explicit extraction engine may extract phrases that are consistent with a particular phrase structure such as, but not limited to: adjective-to-verb, adjective-preposition-verb, noun-preposition-verb, or noun-preposition-noun. The explicit extraction engine 112 may filter the extracted explicit aspects with global and category-specific stop lists, in some embodiments.

Once recognized, the implicit and explicit user sentiment aspects may be provided to users of the user interface, such as by supplementing a feature set of a product, service, or object with explicit aspects included in user reviews, by highlighting common implicit user sentiment aspects of a particular product, service, or object, or otherwise.

Figure 2:
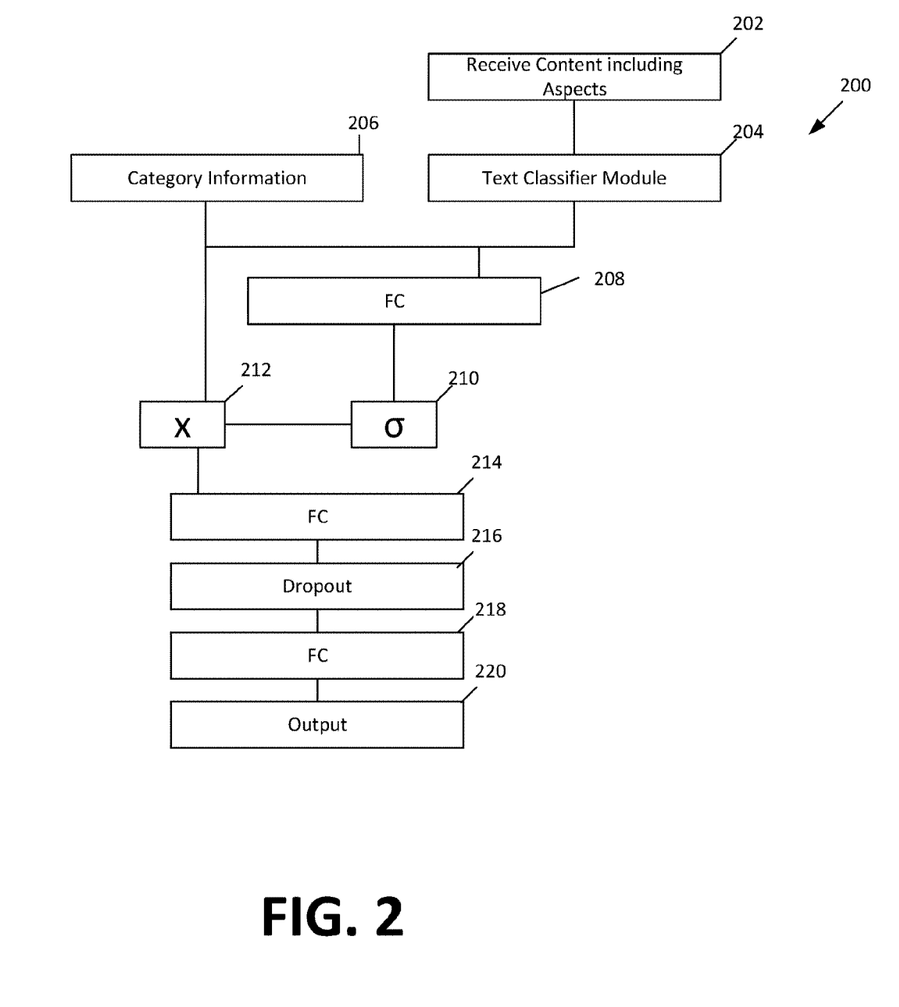
FIG. 2 depicts an example of a gated classifier of performing sentiment analysis including context, according to certain aspects of the present disclosure.

FIG. 2 depicts an example of a gated classifier for performing sentiment analysis including context, according to certain aspects of the present disclosure. In one example, the gated classifier may be a gated RoBERTa model. The gated classifier will be described below with reference to a process 200 performed by the gated classifier. The gated RoBERTa classifier may include a pre-trained RoBERTa model and a gate mechanism. The gate mechanism may increase domain adaptability of sentiment classifier to dozens of categories in a retailer's catalog.

As described in more detail below, FIG. 2 depicts appending category information to the output from the text classifier module before going through a fully connected layer, followed by a sigmoid activation. The sentiment analysis module uses the value from the sigmoid activation to determine whether category information should be preserved by multiplying the sigmoid activation value with the category information and then filters the portion of the category information to pass through to additional processing steps.

At block 202, the process 200 may include receiving textual data respective of a product, service, object, etc. that includes one or more aspects of that product, service, object, etc. In one example, the textual data can include explicit aspects, implicit aspects, or a combination of both. The textual data may be received as a string, in a document format, or the like.

At block 204, the process 200 involves classifying the textual data using a text classifier module. In one example, the text classifier module may be a pre-trained RoBERTa classifier.

At block 206, the process 200 involves receiving textual data that relates to a particular category. In one example, the textual data can include specific words that are domain-specific. The textual data may be received as a list, one or more strings, in a document format, or the like.

At block 208, the process 200 involves applying a fully connected layer of a machine learning model. The fully connected layer receives the output from the text classifier module and connects every neuron in one layer to every neuron in another layer. The fully connected layer may be implemented using any known techniques.

At block 210, the process involves determining, by a gate mechanism, a gate value for the contextual information based on the textual data. In one aspect, the gate mechanism regulates the information flow to additional layers of processing. The textual data may contain domain-specific language, such as domain-specific words, or common words with variations of semantic meaning, which can only be accurately analyzed for sentiment within a domain-specific context. The gate mechanism may process both the category information and the text processed with pre-trained RoBERTa model, using a fully connected layer of neural network. The gate mechanism decides how much, if any, category information to pass through to downstream processing layers. The gate mechanism may determine a set of criteria during a training process by which to determine the amount of category information to pass through.

In general, the gate mechanism is configured with logic to suppress category information that may impede model performance when sentiment analysis of the textual data is less complex. Correspondingly, the gate mechanism may be configured to pass through a higher amount, up to and including, all category information to the model on difficult samples.

In one aspect, the output of the gate mechanism may be grouped into seven bins with equal range. The values of the gate output may range from 0.58 to 0.99, in some embodiments, which value may represent a proportion of category information that is passed through the gate. The gate may output a lower value to indicate that a lesser amount of category information is passed through to downstream processing. The gate mechanism output may be positively correlated with the average length of sentences, while decreased prediction accuracy is associated with longer sentences.

In some examples, the gate mechanism may determine that lengthy sentences may indicate increased difficulty in sentiment analysis and a greater amount of the category information should be passed through to downstream processing, while shorter sentences may indicate a lesser difficulty of sentiment analysis.

In a non-limiting example, some example sentences that may lightly trigger the gate mechanism include 1) "I adore how quiet this machine is, a must for open plan kitchens.", 2) "The dishwasher is easy to use, quiet, and cleans my dishes!", 3) "I am completely satisfied with my new refrigerator." and 4) "This refrigerator has been a wonderful buy for us."

In another example, the gate mechanism may output a greater value and thus pass through a greater quantity of category information. For instance sentences that excessively rely on category information include 1) "By selecting the Sensor Cycle, the machine automatically selects the right cycle for your load, saving on water and energy.", 2) "And lastly, the chime reminder at the end of the wash cycle is perfect to assist in notifying that things are complete.", 3) "Also the ice dispenser is not capable of doing its job without getting ice on the floor, and the switching between ice and water, is not seamless at all." and 4) "It whines and sounds like whiny dirt bikes reading down my road."

At block 212, the process 200 involves combining the output of the gate mechanism (e.g., a sigmoid activation) with the category information. For instance, the sentiment analysis module may determine, based on the sigmoid activation, that a portion of the category information can be passed through to additional processing layers. The gate mechanism may apply a weight to the category information based on the sigmoid activation. In one example, the gate mechanism may update the weight dynamically based on the output at block 220.

At block 214, the process 200 involves applying a fully connected layer of a machine learning model. The fully connected layer receives the category information and the output of the text classifier module. The fully connected layer connects every neuron in one layer to every neuron in another layer.

At block 216, the process 200 involves applying a dropout layer of the machine learning model. The dropout layer may set certain outputs to zero to reduce model overfitting.

At block 218, the process 200 may involves a fully connected layer of the machine learning network. The fully connected layer receives the output of the dropout layer of the machine learning network. The fully connected layer connects every neuron in one layer to every neuron in another layer. The fully connected layer may be implemented using any known techniques.

At block 220, the process 200 involves outputting a sentiment of the content. In some examples, the sentiment may be positive, neutral, or negative. The output may be qualitative or quantitative based on the particular application. In some embodiments, outputting the sentiment may include updating the plurality of category information based on the sentiment and the plurality of aspects. For example, the sentiment may exceed a threshold sentiment and the outputting may include adding the aspect to the plurality of category information. In another example, the outputting may also include updating a weight of the gate mechanism.

Figure 3:
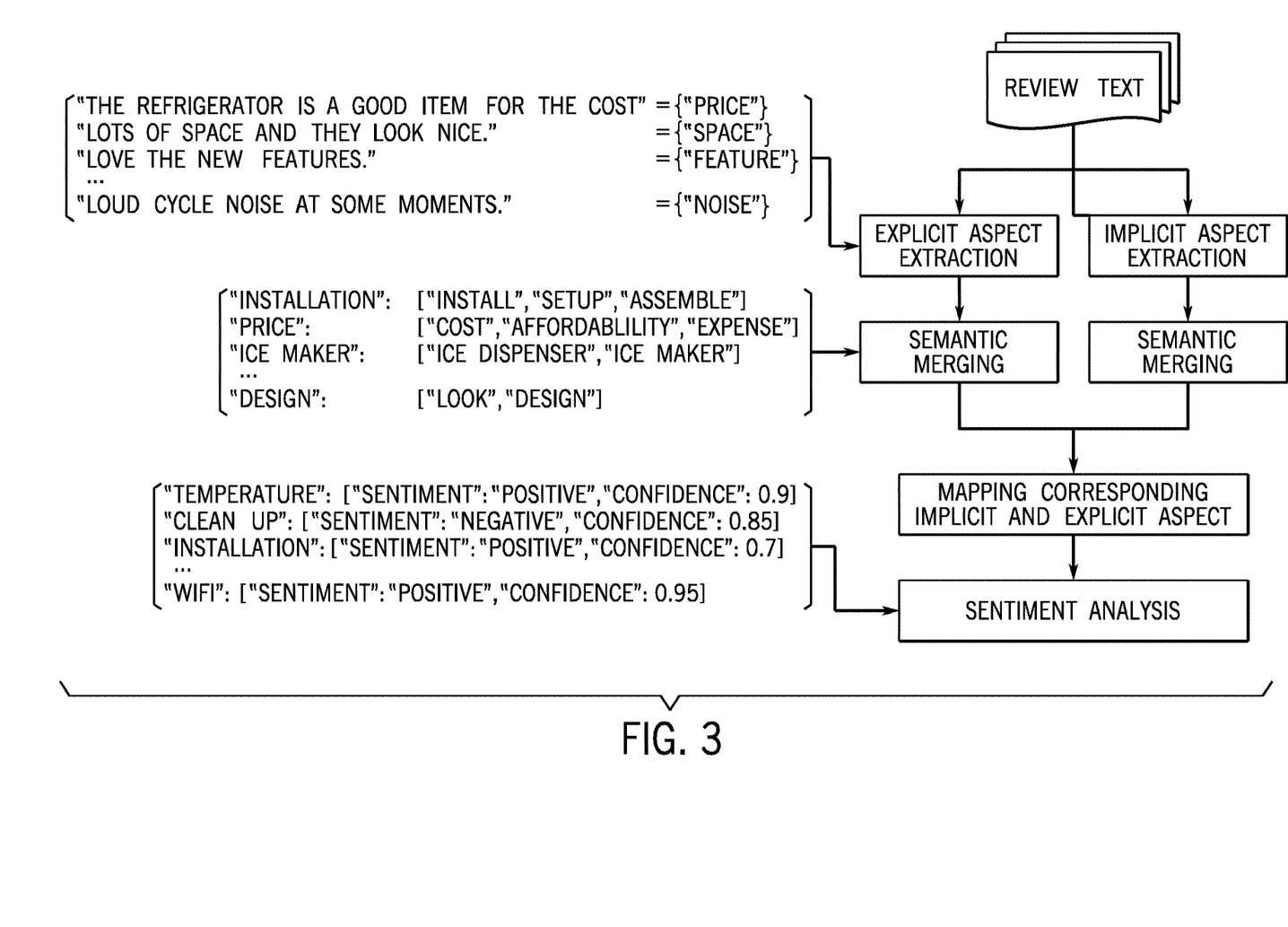
FIG. 3 depicts an example of a process for aspect extraction, according to certain aspects of the present disclosure.

FIG. 3 depicts an example of a process for aspect extraction, according to certain aspects of the present disclosure. The processes of FIG. 3 are understood as described with regard to the components and functions of FIG. 1. An aspect may have several ways of phrasing. For example, aspect "space" of a refrigerator could be expressed as "room", "space" and "space layout". Raw aspects may be merged when their semantic meanings are similar before being presented to customers. To perform semantic merging, Universal Sentence Encoder (USE) may be utilized to encode aspects to high dimensional vectors, then pairwise cosine similarity may be calculated for explicit and implicit aspects individually. In one example, the similarity may be represented by: $\cos(\theta) = A \cdot B |A| \cdot |B|$.

$$\cos(\theta) = \frac{A \cdot B}{|A||B|}$$

The semantic merging of raw aspects may apply hierarchical agglomerative clustering (HAC), which groups leaf nodes to represent multiple concepts within aspects. HAC may be based on the pairwise similarities for explicit and implicit aspects respectively. During the semantic merging, the sentiment analysis module may generate clusters of aspects by applying a threshold to the hierarchical tree. The threshold may be set by maximizing an average Silhouette value of all samples. An individual Silhouette value may be represented by: $s(i)=(b(i)-a(i))/\max\{a(i), b(i)\}$. In this calculation, $a(i)$ is the mean distance between i and all other data points in the same cluster and $b(i)$ is the smallest mean distance of i to all points in any other cluster. The semantic merge can also include other criteria to combine with HAC.

In one example for explicit aspects, the most frequent word/phrase in a cluster may be determined as the aspect word to represent the collective meaning of the cluster.

In an example for implicit aspects, all words in an implicit aspect cluster may be used to find their corresponding explicit aspect. In one step, synonyms and antonyms of the adjectives, from the group of all words, can be retrieved from a lexical database, such as WordNet. In another step, the lemmatized noun forms of the synonyms and antonyms may be obtained and cross matched with the explicit aspects. In another step, any explicit aspect with a match that has the highest number of occurrences may be selected to represent the aspect of the implicit cluster. In the absence of determining an explicit aspect match, the clusters may be abandoned.

Figure 4:
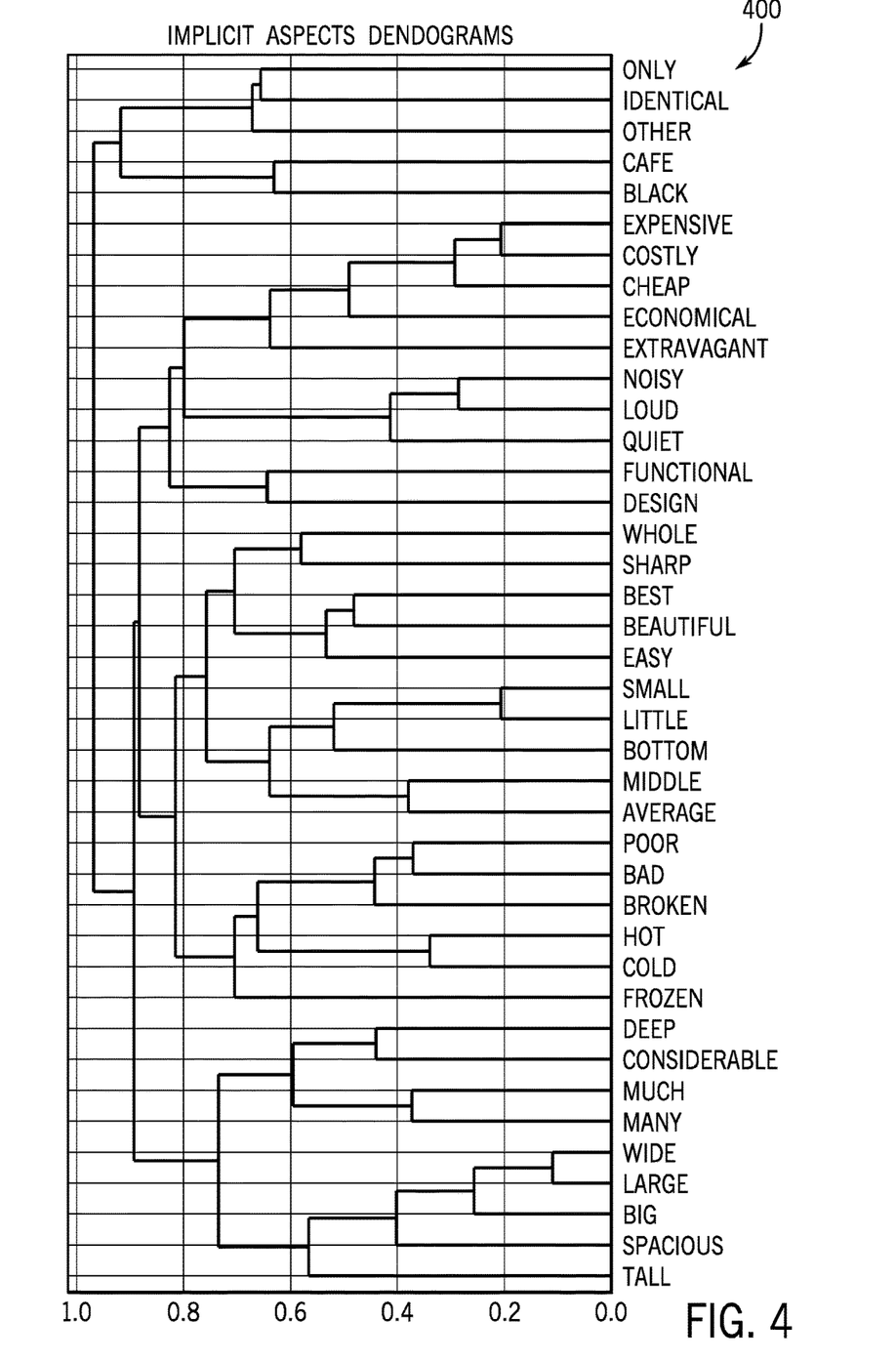
FIG. 4 depicts an example of implicit aspect dendrograms, according to certain aspects of the present disclosure.

FIG. 4 depicts an example of an implicit aspect dendrogram 400, according to certain aspects of the present disclosure. The example dendrogram 400 shows a hierarchical relationship between objects such as keywords. The dendrogram 400 shows the relationships between different implicit keywords. In this example of the hierarchical relationship of implicit aspects using USE as the encoder, where implicit clusters are generated for 1) "expensive", "costly", "cheap", "economical", 2) "noisy", "loud", "quiet", 3) "wide", "large", "big", "spacious" given optimized cut-off at 0.59. The three clusters are mapped to explicit aspects 1) price, 2) noise and 3) space, respectively.

Figure 5:
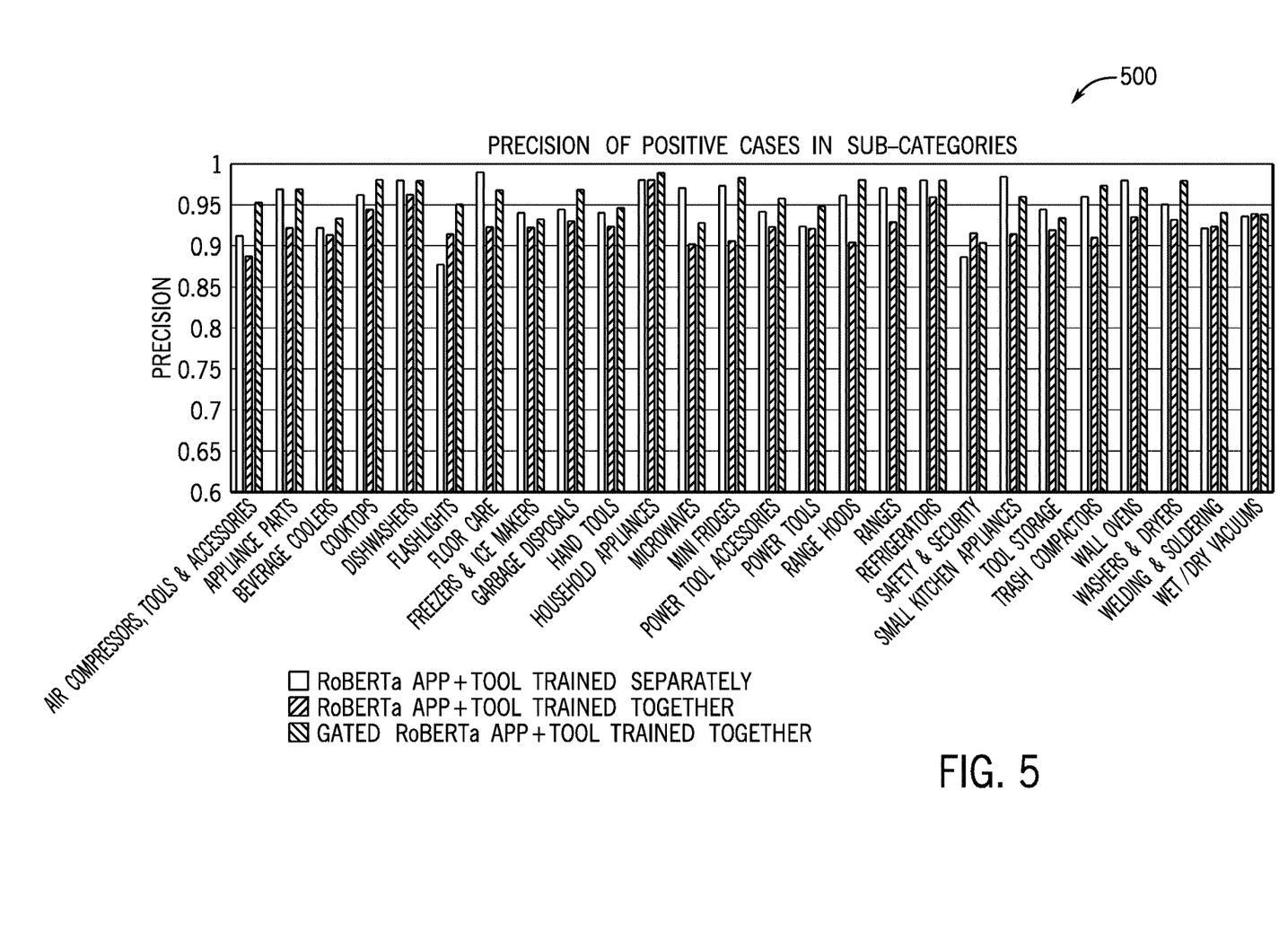
FIG. 5 depicts an example of result data for comparisons of training methods for aspect extraction models for positive sentiment, according to certain aspects of the present disclosure.

FIG. 5 depicts an example of result data for comparisons of training methods for aspect extraction models for positive sentiment, according to certain aspects of the present disclosure. The result data 500 depicts a comparison of two RoBERTa models trained separately on two categories and a merging of the results, a RoBERTa model trained on two categories, and a gated RoBERTa model trained on two categories.

Figure 6:
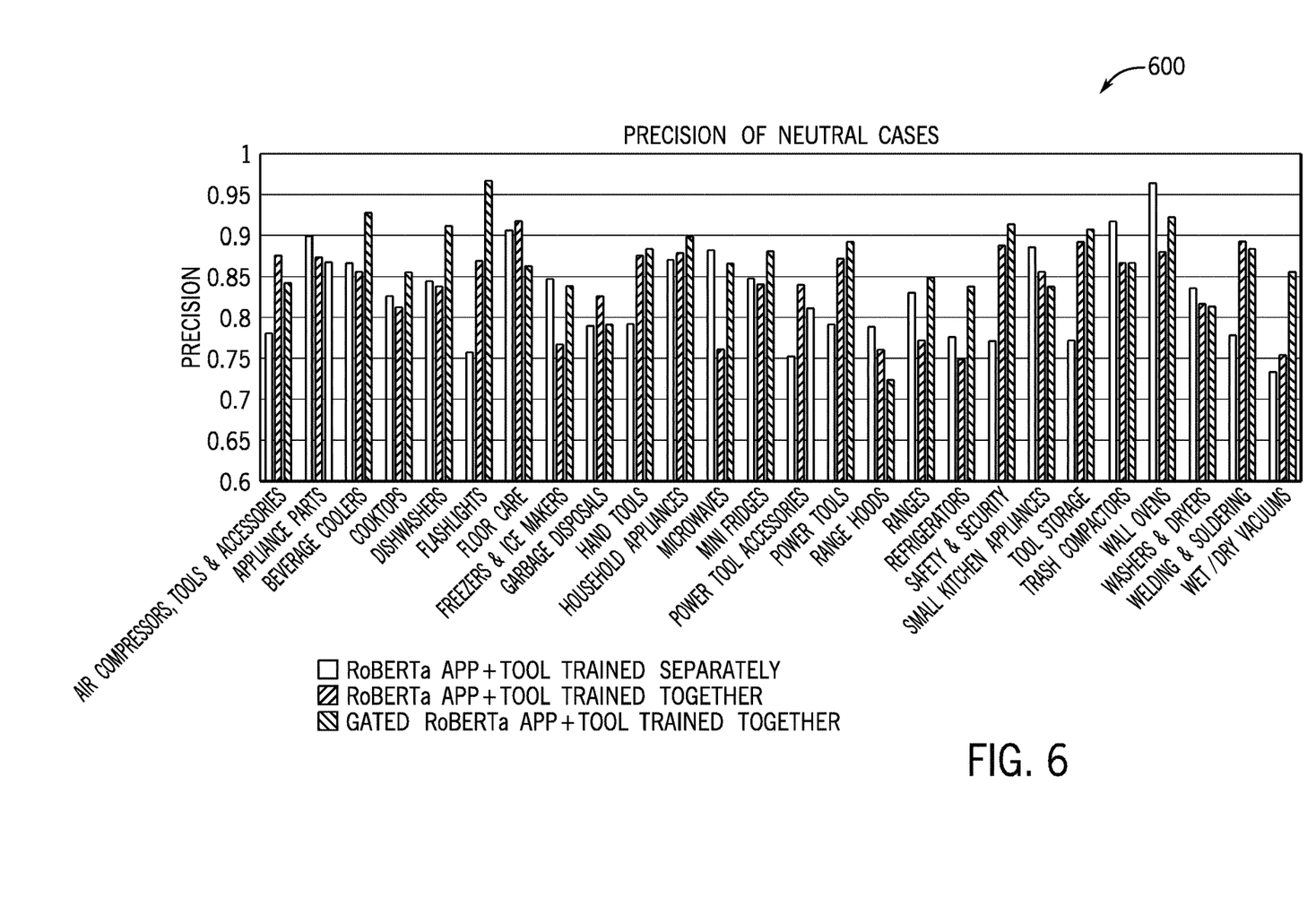
FIG. 6 depicts an example of result data for comparisons of training methods for aspect extraction models for neutral sentiment, according to certain aspects of the present disclosure.

FIG. 6 depicts an example of result data for comparisons of training methods for aspect extraction models for neutral sentiment, according to certain aspects of the present disclosure. The result data 600 depicts a comparison of two RoBERTa models trained separately on two categories and a merging of the results, a RoBERTa model trained on two categories, and a gated RoBERTa model trained on two categories.

Figure 7:
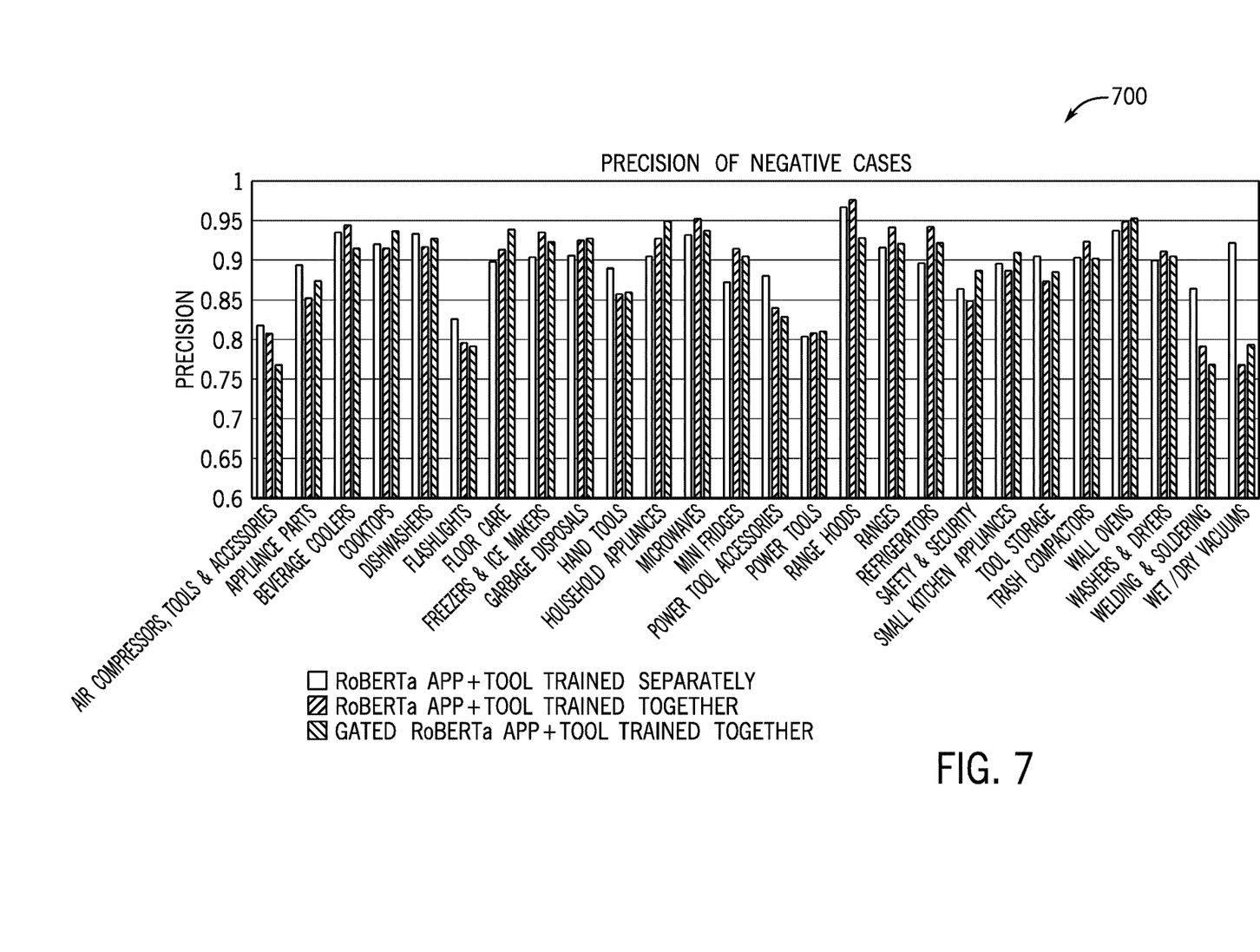
FIG. 7 depicts an example of result data for comparisons of training methods for aspect extraction models for negative sentiment, according to certain aspects of the present disclosure.

FIG. 7 depicts an example of result data for comparisons of training methods for aspect extraction models for negative sentiment, according to certain aspects of the present disclosure. The result data 700 depicts a comparison of two RoBERTa models trained separately on two categories and a merging of the results, a RoBERTa model trained on two categories, and a gated RoBERTa model trained on two categories.

Figure 8:
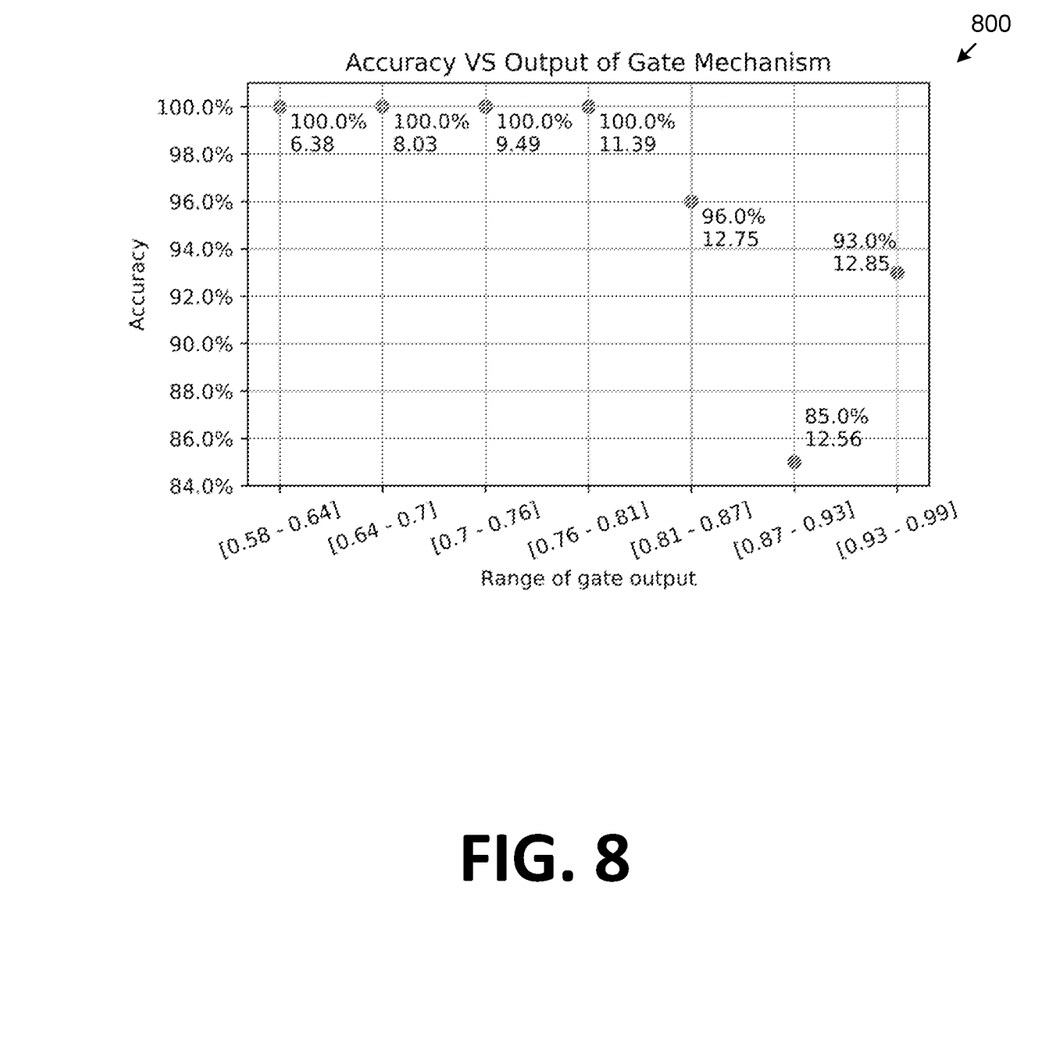
FIG. 8 depicts an example of result data for various gate values of the aspect extraction module, according to certain aspects of the present disclosure.

FIG. 8 depicts an example of result data for various gate values of the aspect extraction module, according to certain aspects of the present disclosure.

The teachings of the instant disclosure may be applied to improve the functionality of a server hosting an e-commerce or other website by extracting product characteristics from user reviews, which characteristics can be provided on the website as filtering or navigation categories, thereby simplifying user navigation and reducing the server's load of searches and page loads.

The teachings of the instant disclosure may be applied to improve the functionality of a server hosting an e-commerce or other website by creating new data or information in the form of "user sentiment", which information may be learned by a trained machine learning classifier. The creation of the new user sentiment information may be provided on the website as filtering or navigation categories, thereby simplifying user navigation and reducing the server's load of searches and page loads.

Figure 9:
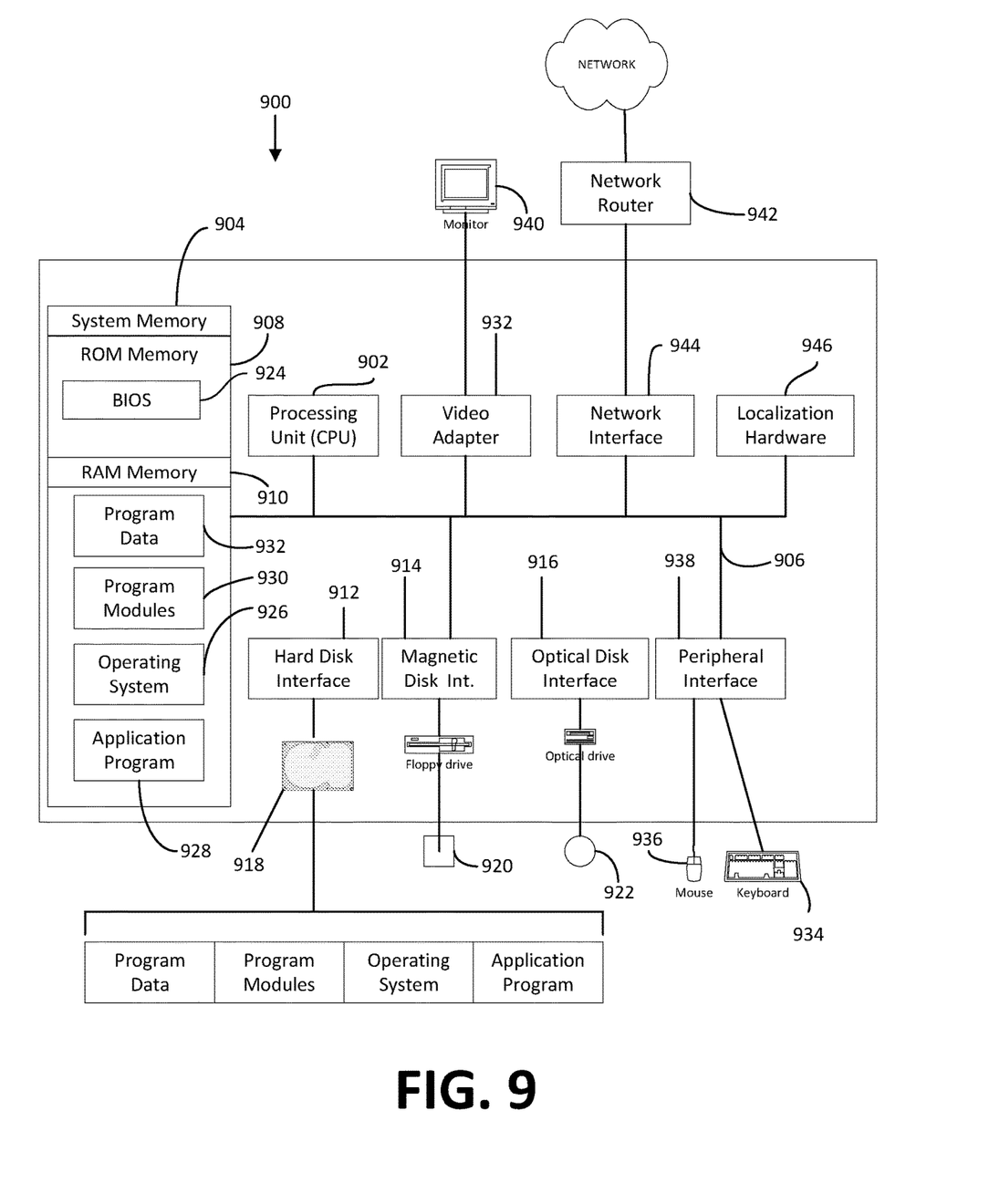
FIG. 9 depicts an example of a computing system for implementing certain aspects of the present disclosure.

FIG. 9 depicts an example of a computing system for implementing certain aspects of the present disclosure. FIG. 9 includes a computing system environment 900, such as a desktop computer, laptop, smartphone, tablet, or any other such device having the ability to execute instructions, such as those stored within a non-transient, computer-readable medium. Furthermore, while described and illustrated in the context of a single computing system 900, those skilled in the art will also appreciate that the various tasks described hereinafter may be practiced in a distributed environment having multiple computing systems 900 linked via a local or wide-area network in which the executable instructions may be associated with and/or executed by one or more of multiple computing systems 900.

In its most basic configuration, computing system environment 900 typically includes at least one processing unit 902 and at least one memory 904, which may be linked via a bus 906. Depending on the exact configuration and type of computing system environment, memory 904 may be volatile (such as RAM 910), non-volatile (such as ROM 908, flash memory, etc.) or some combination of the two. Computing system environment 900 may have additional features and/or functionality. For example, computing system environment 900 may also include additional storage (removable and/or non-removable) including, but not limited to, magnetic or optical disks, tape drives and/or flash drives. Such additional memory devices may be made accessible to the computing system environment 900 by means of, for example, a hard disk drive interface 912, a magnetic disk drive interface 914, and/or an optical disk drive interface 916. As will be understood, these devices, which would be linked to the system bus 906, respectively, allow for reading from and writing to a hard drive 918, reading from or writing to a removable magnetic disk 920, and/or for reading from or writing to a removable optical disk 922, such as a CD/DVD ROM or other optical media. The drive interfaces and their associated computer-readable media allow for the nonvolatile storage of computer readable instructions, data structures, program modules and other data for the computing system environment 900. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 900.

A number of program modules may be stored in one or more of the memory/media devices. For example, a basic input/output system (BIOS) 924, containing the basic routines that help to transfer information between elements within the computing system environment 900, such as during start-up, may be stored in ROM 908. Similarly, RAM 910, hard drive 918, and/or peripheral memory devices may be used to store computer executable instructions comprising an operating system 926, one or more applications programs 928 (which may include the functionality of the Sentiment Analysis Module 102 of FIG. 1, for example), other program modules 930, and/or program data. Still further, computer-executable instructions may be downloaded to the computing system environment 900 as needed, for example, via a network connection.

An end-user may enter commands and information into the computing system environment 900 through input devices such as a keyboard 934 and/or a pointing device 936. While not illustrated, other input devices may include a microphone, a joystick, a game pad, a scanner, etc. These and other input devices would typically be connected to the processing unit 902 by means of a peripheral interface 938 which, in turn, would be coupled to bus 906. Input devices may be directly or indirectly connected to processor 902 via interfaces such as, for example, a parallel port, game port, firewire, or a universal serial bus (USB). To view information from the computing system environment 900, a monitor 940 or other type of display device may also be connected to bus 906 via an interface, such as via video adapter 932. In addition to the monitor 940, the computing system environment 900 may also include other peripheral output devices, not shown, such as speakers and printers.

The computing system environment 900 may also utilize logical connections to one or more computing system environments. Communications between the computing system environment 900 and the remote computing system environment may be exchanged via a further processing device, such as a network router 942, that is responsible for network routing. Communications with the network router 942 may be performed via a network interface component 944. Thus, within such a networked environment, e.g., the Internet, World Wide Web, LAN, or other like type of wired or wireless network, it will be appreciated that program modules depicted relative to the computing system environment 900, or portions thereof, may be stored in the memory storage device(s) of the computing system environment 900.

The computing system environment 900 may also include localization hardware 946 for determining a location of the computing system environment 900. In embodiments, the localization hardware 946 may include, for example only, a GPS antenna, an RFID chip or reader, a WiFi antenna, or other computing hardware that may be used to capture or transmit signals that may be used to determine the location of the computing system environment 900.

The computing environment 900, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system for machine learning classification of user sentiment, the system comprising:
 a sentiment analysis module configured for communication with a search interface, the sentiment analysis module comprising:
  a data store including a plurality of category information, wherein the plurality of category information includes a set of domain-specific category information;
  one or more extraction engines configured to extract a plurality of aspects from textual data obtained from the search interface,
   wherein the plurality of aspects comprises implicit aspects and explicit aspects; and
  a machine learning model configured to:
   receive the plurality of aspects and the set of domain-specific category information; and
   generate a sentiment based on the plurality of aspects and the set of domain-specific category information;
 wherein the search interface is configured to:
  provide user inputs entered through the search interface to the sentiment analysis module;
  receive the sentiment from the sentiment analysis module; and
  update the plurality of category information based on the sentiment and the plurality of aspects; and
 wherein the one or more extraction engines are configured to extract the plurality of aspects from textual data by:
  clustering one or more words or one or more phrases from the textual data,
  determining a most frequent word or phrase in a cluster,
  labeling the most frequent word or phrase as an explicit aspect,
  determining a part of speech associated with the one or more words or one or more phrases,
  responsive to the part of speech, determining a set of synonyms and antonyms of the one or more words or one or more phrases associated with an adjective part of speech,
  responsive to the part of speech, lemmatizing noun forms of the set of synonyms and antonyms to generate a lemmatized noun form,
  determining a match of the lemmatized noun form with the explicit aspects, and
  selecting the explicit aspects based on the match having a greatest number of occurrences to represent an aspect of an implicit cluster.

2. The system of claim 1, wherein the machine learning model comprises:
 a gate mechanism configured to regulate the plurality of category information flow in the machine learning model, wherein the gate mechanism filters a portion of the plurality of category information and passes the set of domain-specific category information.

3. The system of claim 2, wherein the gate mechanism is further configured to filter the set of domain-specific category information and pass a subset of domain-specific category information.

4. A method for machine learning classification of user sentiment, the method comprising:
 storing a plurality of category information, wherein the plurality of category information includes a set of domain-specific category information;
 extracting a plurality of aspects from textual data obtained from a search interface, the extracting comprising:
  clustering one or more words or one or more phrases from the textual data,
  determining from the textual data, a most frequent word or phrase in a cluster as a meaning of the cluster,
  labeling the most frequent word or phrase as an explicit aspect,
  determining a part of speech associated with the one or more words or one or more phrases,
  responsive to the part of speech, determining a set of synonyms and antonyms of the one or more words or one or more phrases associated with an adjective part of speech,
  responsive to the part of speech, lemmatizing noun forms of the set of synonyms and antonyms to generate a lemmatized noun form,
  determining a match of the lemmatized noun form with explicit aspects, and
  selecting the explicit aspect based on the match having a greatest number of occurrences to represent the aspect of an implicit cluster; and
 generating a sentiment by a machine learning model, the generating comprising:
  receiving the plurality of aspects and the set of domain-specific category information; and
  generating a sentiment based on the plurality of aspects and the set of domain-specific category information;
 wherein the plurality of aspects comprises an implicit aspect and the explicit aspect.

5. The method of claim 4, wherein the machine learning model comprises:
 a gate mechanism configured to regulate the plurality of category information flow in the machine learning model, wherein the gate mechanism filters a portion of the plurality of category information and passes the set of domain-specific category information.

6. The method of claim 4, wherein gate mechanism is further configured to filter the set of domain-specific category information and pass a subset of domain-specific category information.

7. The method of claim 4 further comprising:
 receiving, by the search interface, the sentiment from a sentiment analysis module; and
 updating, by the search interface, the plurality of category information based on the sentiment and the plurality of aspects.

8. A method of for gated machine learning, the method comprising
 storing a plurality of category information, wherein the plurality of category information includes a set of domain-specific category information;
 extracting a plurality of aspects from textual data obtained from a search interface, the extracting comprising:
  determining a part of speech associated with one or more words or one or more phrases,
  responsive to the part of speech, determining a set of synonyms and antonyms of the one or more words or one or more phrases associated with an adjective part of speech,
  responsive to the adjective part of speech, lemmatizing noun forms of the set of synonyms and antonyms to generate a lemmatized noun form,
  determining a match of the lemmatized noun form with explicit aspects, and
  selecting the explicit aspects based on the match having a greatest number of occurrences to represent an aspect of an implicit cluster; and
 generating a sentiment by a machine learning model, the generating comprising:
  receiving the plurality of aspects and the set of domain-specific category information; and
  generating a sentiment based on the plurality of aspects and the set of domain-specific category information;
  filtering, by a gate mechanism, the plurality of category information in the machine learning model, wherein the gate mechanism filters the set of domain-specific category information, wherein the gate mechanism comprises applying a weight to the domain-specific category information;
  updating the plurality of category information based on the sentiment and the plurality of aspects; and
  updating the weight of the gate mechanism based on the sentiment and the plurality of aspects.

9. The method of claim 8, wherein gate mechanism is further configured pass a subset of the set of domain-specific category information.

10. The method of claim 8, wherein the plurality of aspects comprises an implicit aspect and an explicit aspect.

11. The method of claim 8, wherein the extracting comprises:
 clustering one or more words or one or more phrases from the textual data;
 determining from the textual data, a most frequent word or phrase in a cluster as a meaning of the cluster; and
 labeling the most frequent word or phrase as an explicit aspect.

12. The method of claim 8, wherein updating the plurality of category information based on the sentiment and the plurality of aspects comprises adding a new aspect to the plurality of aspects based on the sentiment exceeding a threshold.

13. The method of claim 8, wherein updating the weight of the gate mechanism based on the sentiment and the plurality of aspects comprises adjusting a value of the weight responsive to the sentiment exceeding a threshold.

* * * * *